US008452144B2

(12) United States Patent
Saito et al.

(10) Patent No.: US 8,452,144 B2

(45) Date of Patent: May 28, 2013

(54) LIGHT EMITTER AND LIGHT EMITTING DEVICE

(75) Inventors: Shinji Saito, Kanagawa (JP); Yasushi Hattori, Kanagawa (JP); Rei Hashimoto, Tokyo (JP); Shinya Nunoue, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 287 days.

(21) Appl. No.: 13/034,128

(22) Filed: Feb. 24, 2011

(65) Prior Publication Data

US 2012/0056524 A1 Mar. 8, 2012

(30) Foreign Application Priority Data

Sep. 6, 2010 (JP) ................................ 2010-198633

(51) Int. Cl.
*G02B 6/02* (2006.01)

(52) U.S. Cl.
USPC ............ 385/126; 385/27; 385/122; 385/123; 385/127

(58) Field of Classification Search
USPC ........................................................ 385/126
See application file for complete search history.

(56) References Cited

U.S. PATENT DOCUMENTS

| | | | | |
|---|---|---|---|---|
| 5,530,709 | A * | 6/1996 | Waarts et al. | 372/6 |
| 6,584,714 | B1 * | 7/2003 | Wehrmann et al. | 40/546 |
| 6,795,460 | B1 * | 9/2004 | Itoh | 372/34 |
| 7,277,618 | B2 | 10/2007 | Yamazaki et al. | |
| 7,505,655 | B2 | 3/2009 | Yamazaki et al. | |
| 7,978,947 | B2 | 7/2011 | Goto | |
| 2003/0030067 | A1 * | 2/2003 | Chen | 257/102 |
| 2007/0122103 | A1 * | 5/2007 | Yamazaki et al. | 385/142 |
| 2007/0229938 | A1 | 10/2007 | Yamazaki et al. | |
| 2008/0049317 | A1 * | 2/2008 | Hara et al. | 359/483 |
| 2008/0192458 | A1 * | 8/2008 | Li | 362/84 |
| 2009/0207485 | A1 | 8/2009 | Goto | |
| 2009/0317041 | A1 | 12/2009 | Goto | |
| 2010/0053970 | A1 | 3/2010 | Sato et al. | |
| 2011/0122903 | A1 | 5/2011 | Okamoto et al. | |

FOREIGN PATENT DOCUMENTS

| | | |
|---|---|---|
| JP | 2000-47038 | 2/2000 |
| JP | 3434726 | 5/2003 |
| JP | 2007-155820 A | 6/2007 |
| JP | 2009-76493 A | 4/2009 |
| JP | 2010-141283 A | 6/2010 |
| WO | WO 2008/053922 | 5/2008 |
| WO | WO 2008/108404 A1 | 9/2008 |

OTHER PUBLICATIONS

Japanese Office Action Issued Sep. 11, 2012 in Patent Application No. 2010-198633 (with English translation).
U.S. Appl. No. 12/876,738, filed Sep. 7, 2010, Yasushi Hattori, et al.
U.S. Appl. No. 12/876,675, filed Sep. 7, 2010, Yasushi Hattori, et al.

* cited by examiner

*Primary Examiner* — Ryan Lepisto
(74) *Attorney, Agent, or Firm* — Oblon, Spivak, McClelland, Maier & Neustadt, L.L.P.

(57) ABSTRACT

A light emitter according to one embodiment has a fiber shape. And it includes a core portion containing a light emitting material, the material absorbing excitation light and emitting light having a wavelength longer than a wavelength of the excitation light. And also it includes a clad portion provided outside the core portion, the clad portion having a first region and second regions, the second regions being periodically formed in the first region, the second regions having a refractive index higher than a refractive index of a first region, the refractive index of the first region being equal to or higher than a refractive index of the core portion.

20 Claims, 8 Drawing Sheets

LIGHT EMITTER AND LIGHT EMITTING DEVICE

CROSS-REFERENCE TO RELATED APPLICATION

This application is based upon and claims the benefit of priority from Japanese Patent Application No. 2010-198633, filed on Sep. 6, 2010, the entire contents of which are incorporated herein by reference.

FIELD

Embodiments described herein relate generally to a semiconductor light emitting element.

BACKGROUND

A semiconductor light emitting element, such as a laser diode (LD) or a light emitting diode (LED), is widely used in a display device, an illumination device, and a recording device. In recent years, solid-state illumination is developed as a new application. In particular, a backlight source of an illumination device or a liquid crystal display device is replaced by a white light emitting device obtained by combining the semiconductor light emitting element and a fluorescent substance.

For example, a liquid crystal display device is miniaturized for a portable apparatus. Also, miniaturization is needed in a light emitting device used in the backlight source.

DETAILED DESCRIPTION

Figure 1A:
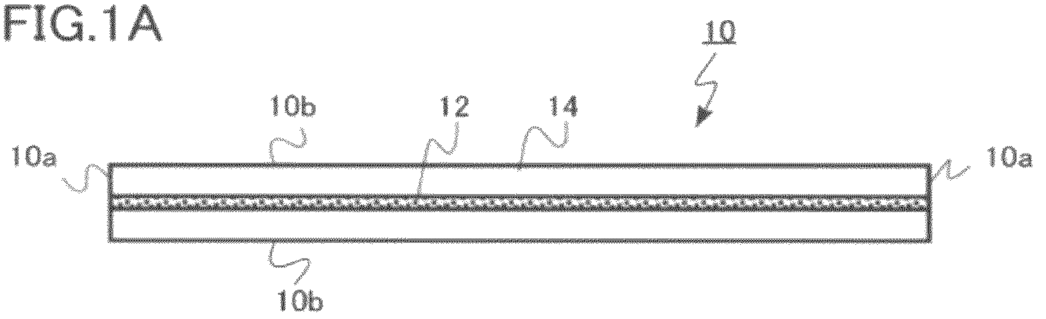
FIGS. 1A and 1B are schematic cross-sectional views of a light emitter according to a first embodiment.

A light emitter according to one embodiment has a fiber shape. And it includes a core portion containing a light emitting material, the material absorbing excitation light and emitting light having a wavelength longer than a wavelength of the excitation light. And also it includes a clad portion provided outside the core portion, the clad portion having a first region and second regions, the second regions being periodically formed in the first region, the second regions having a refractive index higher than a refractive index of a first region, the refractive index of the first region being equal to or higher than a refractive index of the core portion.

Hereinafter, the embodiments will be described using the drawings. In the drawings, same or similar elements are denoted by same or similar reference numerals.

The "refractive index" described in the specification means a refractive index defined for the wavelength of excitation light to be incident on the light emitter.

(First Embodiment)

A light emitter according to the first embodiment has a fiber shape. And it includes a core portion which contains light emitting materials absorbing excitation light and emitting light having the wavelength longer than the wavelength of the excitation light and a clad portion which is provided outside the core portion and in which plural second regions having a refractive index higher than a refractive index of a first region are periodically formed in the first region having a refractive index not less than a refractive index of the core portion. A light source of the excitation light may be located adjacent to the light emitter.

By including the above configuration, the light emitter according to this embodiment propagates the excitation light, which is incident from one end face of the light emitter having the fiber shape, in an extension direction of the light emitter.

Meanwhile, light that is emitted from the light emitting materials absorbing the excitation light is extracted from an external surface (or side surface) of the light emitter (or the clad portion). That is, the light is extracted in a direction substantially vertical to the extension direction of the light emitter. Therefore, a light emitter that emits linear shaped light is realized.

Figure 1B:
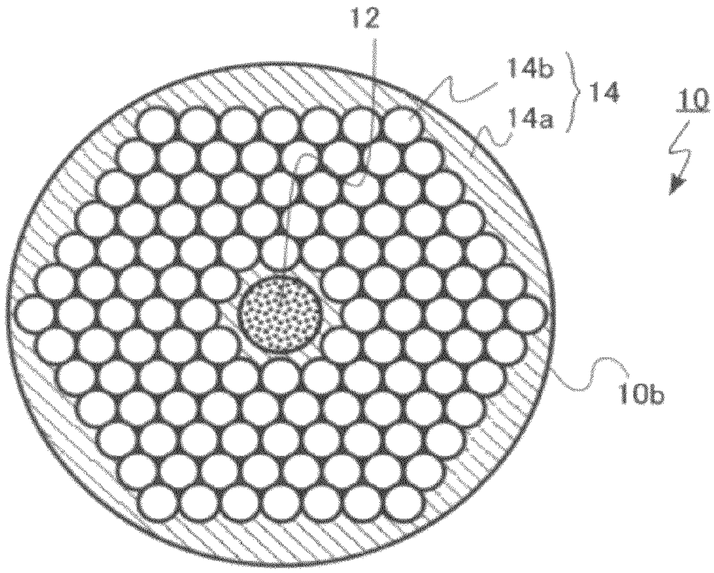

FIGS. 1A and 1B are schematic cross-sectional views of the light emitter according to this embodiment. FIG. 1A is a cross-sectional view taken along a direction parallel to the extension direction of the light emitter and FIG. 1B is a cross-sectional view taken along a direction vertical to the extension direction of the light emitter.

A light emitter 10 according to this embodiment has a fiber shape. The light emitter 10 includes a core portion 12 and a clad portion 14 that is provided outside the core portion 12.

The core portion 12 contains light emitting materials that absorb the excitation light and emit light having the wavelength longer than the wavelength of the excitation light. The excitation light is near-ultraviolet light (having wavelength of 200 to 410 nm). For example, the light emitting materials that absorb the near-ultraviolet light having the wavelength of 405 nm and emit blue, green, and red fluorescent light are contained in $AlF_3$ (aluminum fluoride) glass.

For example, thulium (Tm) is applied as the light emitting material that emits the blue fluorescent light (first light emitting material), terbium (Tb) is applied as the light emitting material that emits the green fluorescent light (second light emitting material), and europium (Eu) is applied as the light emitting material that emits the red fluorescent light (third light emitting material).

The clad portion 14 has a first region 14*a* that has a refractive index not less than a refractive index of the core portion and plural second regions 14*b* that have a refractive index higher than a refractive index of the first region.

As shown in FIG. 1B, the second regions 14*b* that have circular sections vertical to the extension direction of the light emitter are periodically formed in a triangular lattice shape in the first region 14*a*. The periodic arrangement of the second regions 14*b* is designed to confine the excitation light incident from the side of any one of the end faces 10*a* of the light emitter in the light emitter and propagate the excitation light in the extension direction of the light emitter. Meanwhile, the periodic arrangement of the second regions 14*b* is designed to extract the light having the wavelength longer than the wavelength of the excitation light emitted from the light emitting materials from the external surface 10$b$ of the light emitter (or the clad portion), without confining the excitation light in the light emitter.

In the light emitter 10 according to this embodiment, since the effective refractive index of the clad portion 14 becomes higher than the effective refractive index of the core portion 12, normally the light that is propagated from the core portion 12 to the clad portion 14 is extracted from the external surface, without being confined in the light emitter 10.

However, only the light having the specific wavelength, in this case, the excitation light can be made not to exist in the clad portion by designing the second regions 14$b$ with the appropriate arrangement using an electromagnetic analysis method. The design of the appropriate arrangement can be analytically derived using the refractive index of the material of the core portion 12, the refractive index of the first region 14$a$, the second refractive index of the second regions 14$b$, the shape and the size of the second regions 14$b$, and an interval of the second regions 14$b$ etc., as parameters.

Figure 2:
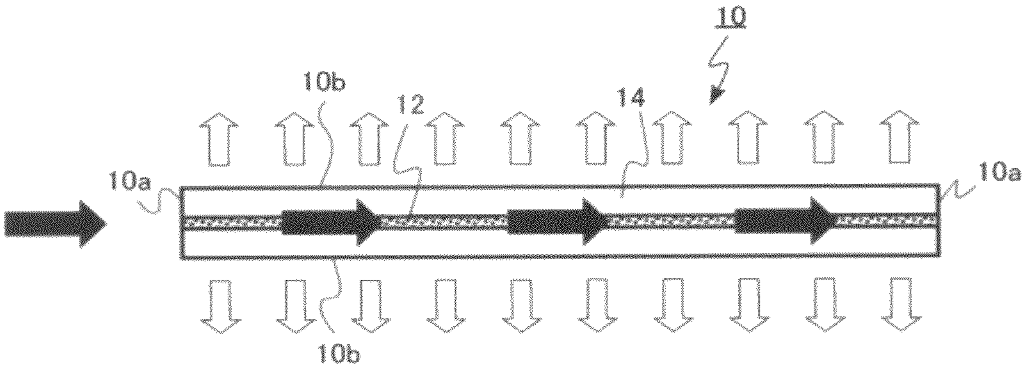
FIG. 2 is a diagram showing a function of the light emitter according to the first embodiment.

FIG. 2 shows a function of the light emitter according to this embodiment. As shown in FIG. 2, near-ultraviolet light (shown by black arrows in FIG. 2) that is the excitation light incident from one end face 10$a$ of the light emitter 10 is confined in the core portion and is propagated in the extension direction of the light emitter 10.

The light emitting material that is contained in the core portion 12 is excited by the near-ultraviolet light, and blue, green, and red fluorescent light is emitted. The fluorescent light is extracted from the external surface 10$b$ of the light emitter 10 without being confined in the core portion 12. The blue, green, and red fluorescent light is mixed and becomes white light (shown by white arrows in FIG. 2).

Figure 3:
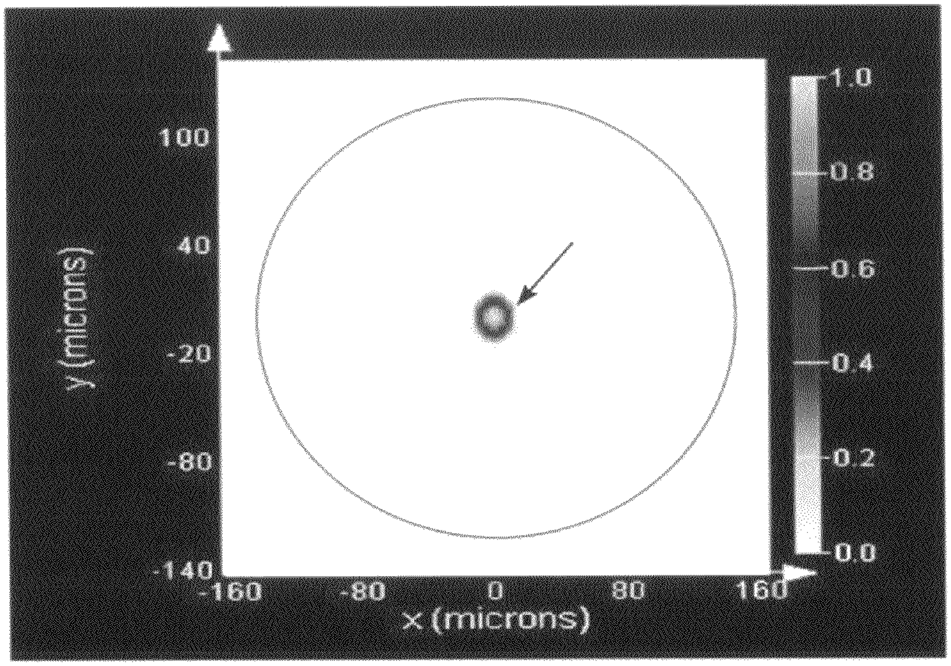
FIG. 3 is a diagram showing a simulation result of a confinement effect of excitation light according to the first embodiment.

FIG. 3 shows a simulation result of a confinement effect of the excitation light. A strength distribution of light, which is propagated through the light emitter and has the wavelength of 405 nm, in a section of the light emitter is simulated using a finite element method (FEM).

The refractive index of each of the core portion 12 and the first region 14$a$ is set to 1.46 and the refractive index of the second region 14$b$ is set to 1.75. The second regions 14$b$ that have the circular sections are periodically disposed in a triangular lattice shape. The diameter and the interval of the second regions 14$b$ are set to 2.6 μm and 5.0 μm, respectively. The outer diameter of the light emitter 10 is set to 125 μm.

As shown in FIG. 3, it can be seen that the light strength of the core portion 12 (shown by an arrow) of the center of the light emitter 10 is locally increased. As such, if the second regions 14$b$ are designed with the appropriate arrangement, the excitation light can be confined in the light emitter 10 and can be propagated in the extension direction of the light emitter 10.

In this embodiment, the light emitter that uses the excitation light as laser light of the near-ultraviolet light, emits the blue, green, and red fluorescent light, and emits the white light is exemplified. However, a light emitter that emits monochromatic light, not the white light may be used. In this case, the core portion may contain a light emitting material that emits only the blue light, or the green light, or the red light, or the yellow light.

The external surface (or the clad portion) of the light emitter 10 preferably has an uneven structure of an opaque glass shape. This is because total reflection of the light emitted from the light emitting material in the external surface 10$b$ is suppressed and extraction efficiency of the light from the light emitter 10 is improved.

The height difference of unevenness of the uneven structure is preferably more than a period of the unevenness. This is because the deterioration of the extraction efficiency of the light caused by the total reflection can be suppressed.

In one end face 10$a$ of the light emitter 10, i.e. an end face of the core portion 12, a dielectric multilayer film is preferably provided as a reflection film to reflect the excitation light propagated through the core portion 12 not to leak to the outside.

Figure 4:
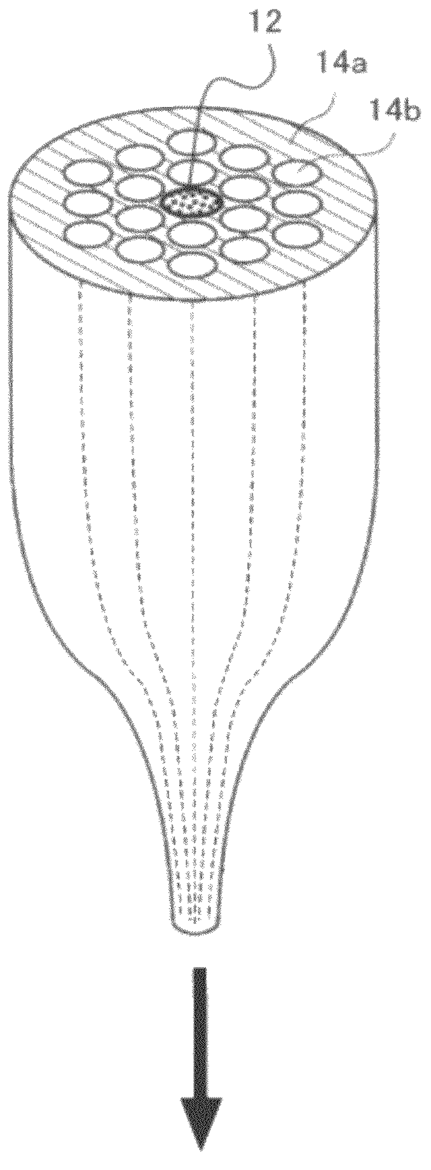
FIG. 4 is a schematic diagram showing an example of a method of manufacturing a light emitter according to the first embodiment.

Next, an example of a method of manufacturing the light emitter according to this embodiment will be described. FIG. 4 schematically shows an example of a method of manufacturing a light emitter according to this embodiment.

As shown in FIG. 4, glass rods that become materials of the core portion 12, the first region 14$a$, and the second regions 14$b$ are bound, such that the second regions 14$b$ are disposed in a triangular lattice shape. By drawing the bound glass rods in an arrow direction of FIG. 4 under the high temperature, a light emitter having a fiber shape can be manufactured.

Further, fluorescent materials, such as thulium (Tm), terbium (Tb), and europium (Eu), which emit fluorescent light, are previously added to the glass rod of the core portion 12. The addition amount of the fluorescent materials is optimally selected according to the length of the fiber.

For example, when aluminum fluoride ($AlF_3$) glass is used in the core portion 12 and the first region 14$a$, zirconium fluoride ($ZrF_3$) glass is used in the second regions 14$b$, the outer diameter of the light emitter 10 is set to 125 μm, and the length of the light emitter is set to 900 mm, the addition amount of the light emitting material is preferably set to 4 to 15 mol %.

(Second Embodiment)

A light emitter according to the second embodiment is the same as the light emitter according to the first embodiment, except that the height difference of the unevenness of the uneven structure of the external surface of the light emitter is more than the period of the unevenness and the height difference of the unevenness is 3λ or less when the peak wavelength of the light emitted from the light emitting material is set to λ. Therefore, the same contents as those of the first embodiment are not described.

Figure 5:
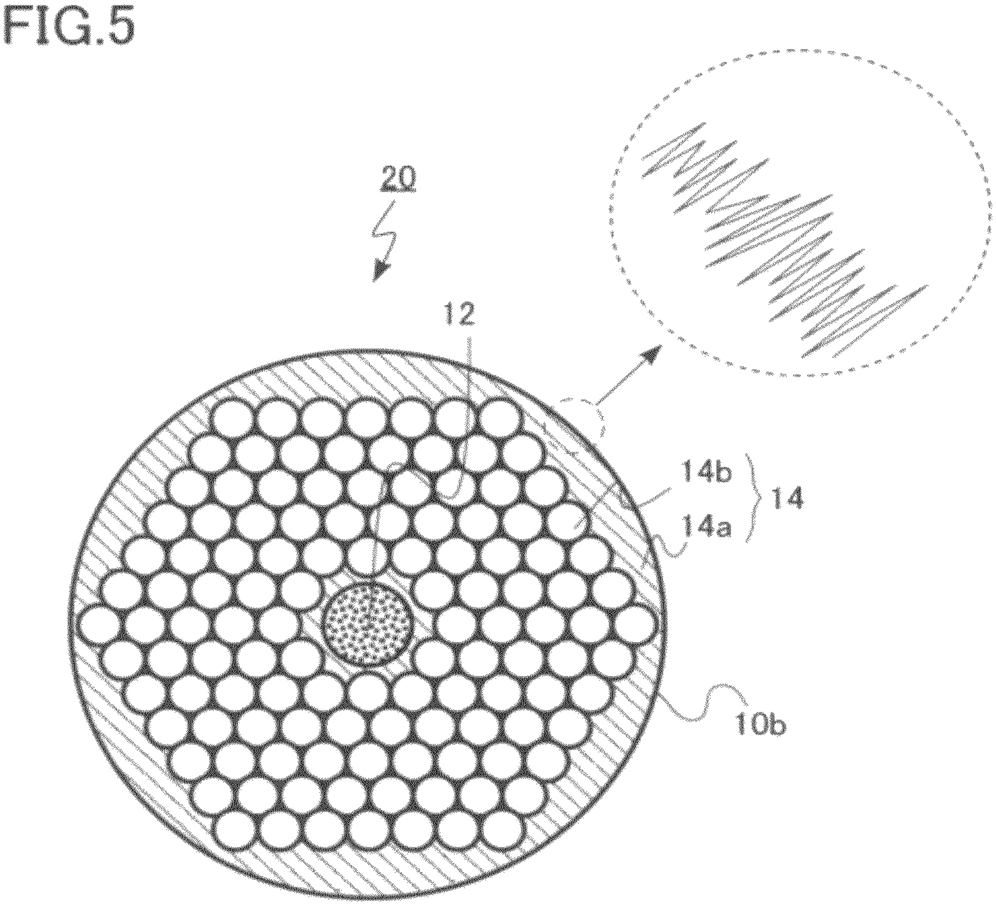
FIG. 5 is a schematic cross-sectional view of a light emitter according to a second embodiment.

FIG. 5 is a schematic cross-sectional view of the light emitter according to this embodiment, which is a cross-sectional view taken along a direction parallel to the extension direction of the light emitter.

As enlarged and shown in a dotted-line circle of FIG. 5, a light emitter 20 according to this embodiment includes an uneven structure in which the height difference of the unevenness is more than the period of the unevenness and the height difference of the unevenness is 3× or less when the peak wavelength of the light emitted from the light emitting material is set to λ, in the external surface 10$b$.

Figure 6:
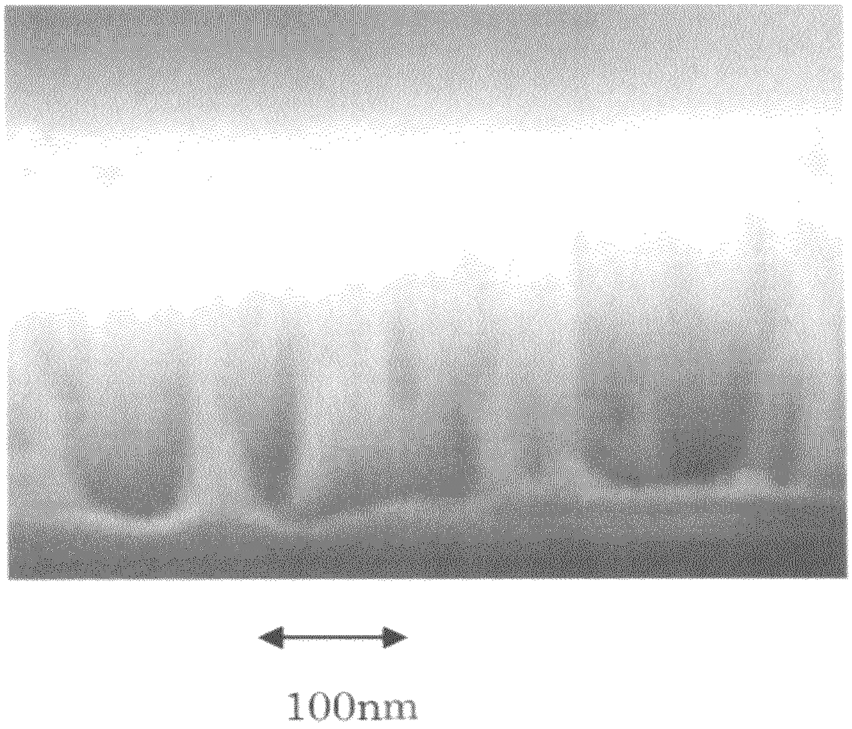
FIG. 6 is an SEM photograph showing an example of an uneven structure according to the second embodiment.

Specifically, the unevenness structure is a structure that has the height of an aspect of 2 or more at an interval of several tens or several hundreds nm. FIG. 6 is an SEM photograph showing an example of an uneven structure according to this embodiment.

The uneven structure is a so-called moth-eye structure. By this structure, total reflection of the light emitted from the light emitting material in the external surface is almost perfectly suppressed. Therefore, extraction efficiency of the light that is emitted from the light emitting material becomes almost 100%.

For example, this moth-eye structure can be manufactured by dry etching using a block copolymer as a mask. Simply, the moth-eye structure can be manufactured by etching based on a 10% water solution of a hydrofluoric acid.

(Third Embodiment)

A light emitter according to the third embodiment is the same as the light emitter according to the first embodiment, except that a reflection material is provided in a portion of the external surface of the light emitter. Therefore, the same contents as those of the first embodiment are not described.

Figure 7A:
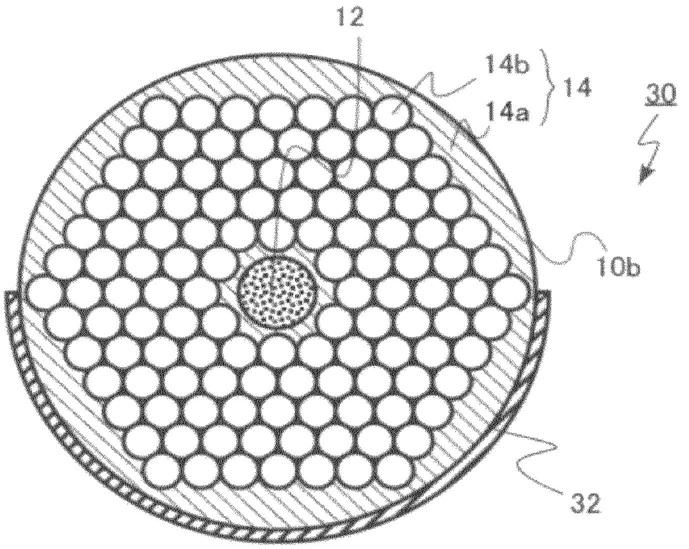
FIGS. 7A and 7B are schematic cross-sectional views of a light emitter according to a third embodiment.
Figure 7B:
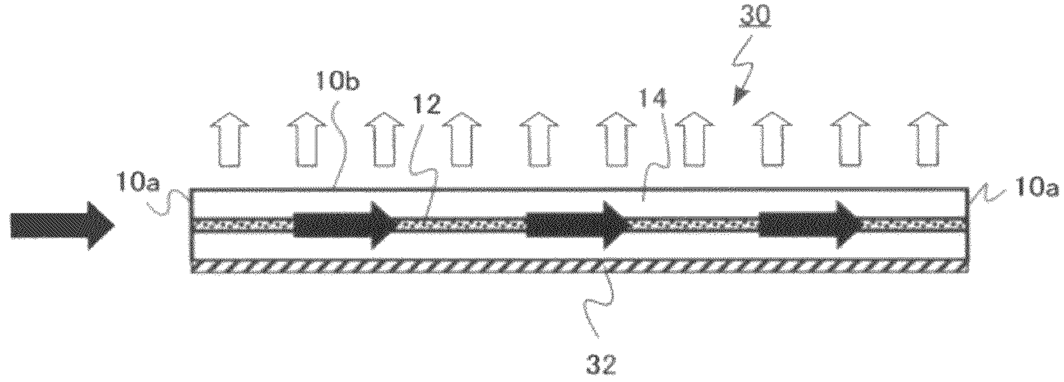

FIGS. 7A and 7B are schematic cross-sectional views of the light emitter according to this embodiment. FIG. 7A is a cross-sectional view taken along a direction vertical to the extension direction of the light emitter and FIG. 7B is a cross-sectional view taken along a direction parallel to the extension direction of the light emitter, and both of them show a function of the light emitter.

In a portion of an external surface 10*b* of a light emitter 30 according to this embodiment, in this case, a lower portion, a reflection material 32 is provided. The reflection material 32 is obtained by coating aluminum (Al).

According to this embodiment, as shown in FIG. 7B, the light that is emitted from the light emitting material can be extracted from only the external surface 10*b* where the reflection material 32 of the light emitter 30 is not provided.

(Fourth Embodiment)

A light emitting device according to the fourth embodiment is a light emitting device that includes the light emitter according to the first, second or third embodiment. Therefore, the same contents as those of the first to third embodiments are not described.

Figure 8:
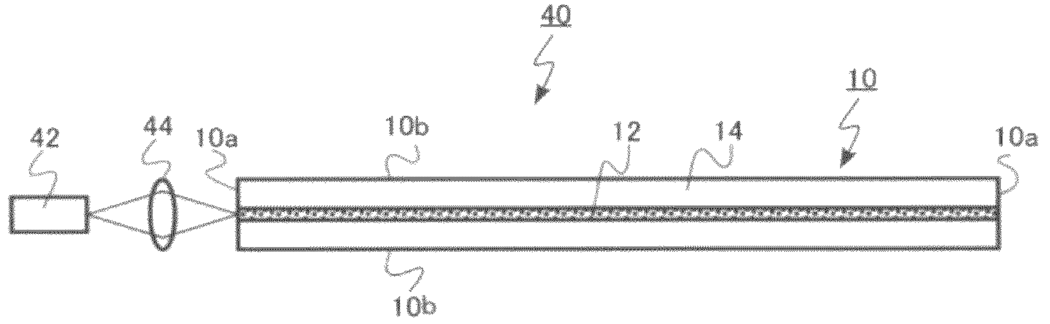
FIG. 8 is a schematic cross-sectional view of a light emitting device according to a fourth embodiment.

FIG. 8 is a schematic cross-sectional view of the light emitting device according to this embodiment. Alight emitting device 40 according to this embodiment includes a laser light source 42 that includes emits near-ultraviolet light as excitation light and a light emitter 10 that includes a core portion 12 which contains a light emitting material absorbing excitation light and emitting light having the wavelength longer than the wavelength of the excitation light and a clad portion 14 which is provided outside the core portion 12 and in which plural second regions having a refractive index higher than a refractive index of a first region are periodically formed in the first region having a refractive index not less than a refractive index of the core portion 12, and has a fiber shape. The excitation light is incident from one end face 10*a* of the light emitter 10 and the light that is emitted from the light emitting material is extracted from the external surface 10*b* of the light emitter 10.

A condensing lens 44 that condenses laser light corresponding to the excitation light is provided between the laser light source 42 and the light emitter 10. For example, the condensing lens is a ball lens that has a spherical shape. A reflection film that is not shown in the drawings is provided on the end face 10*a* opposite to the end face 10*a* on which the laser light is incident.

According to this embodiment, the light emitting device that emits linear light, for example, white light can be realized.

FIG. 8 shows the example of the case using the light emitter 10 according to the first embodiment. However, the light emitter 20 according to the second embodiment or the light emitter 30 according to the third embodiment may be applied.

(Fifth Embodiment)

Alight emitting device according to the fifth embodiment is a light emitting device that has the same configuration as that of the light emitting device according to the fourth embodiment and emits planar light. The same contents as those of the first to fourth embodiments are not described.

Figure 9A:
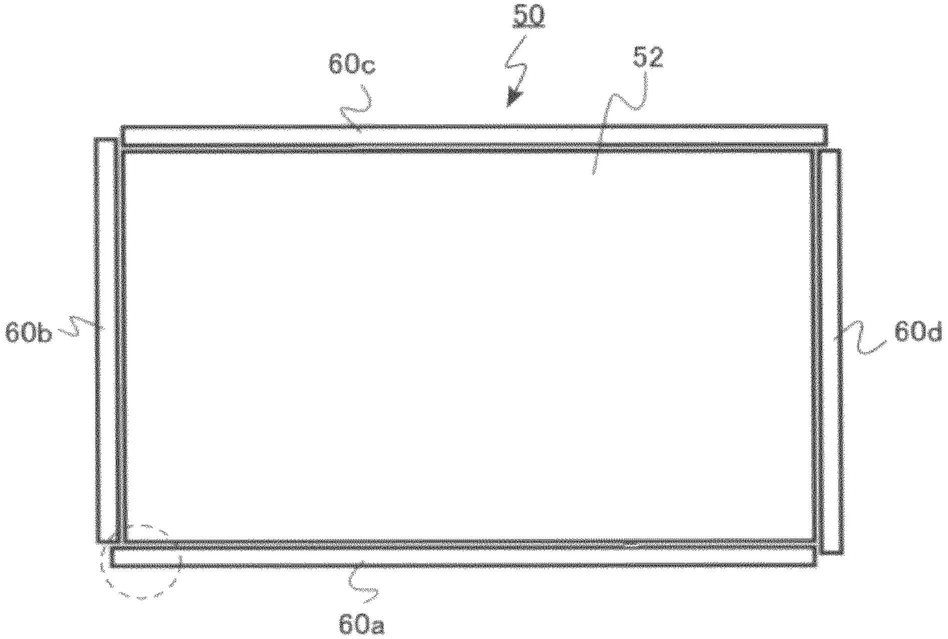
FIGS. 9A and 9B are schematic diagrams of a light emitting device according to a fifth embodiment.
Figure 9B:
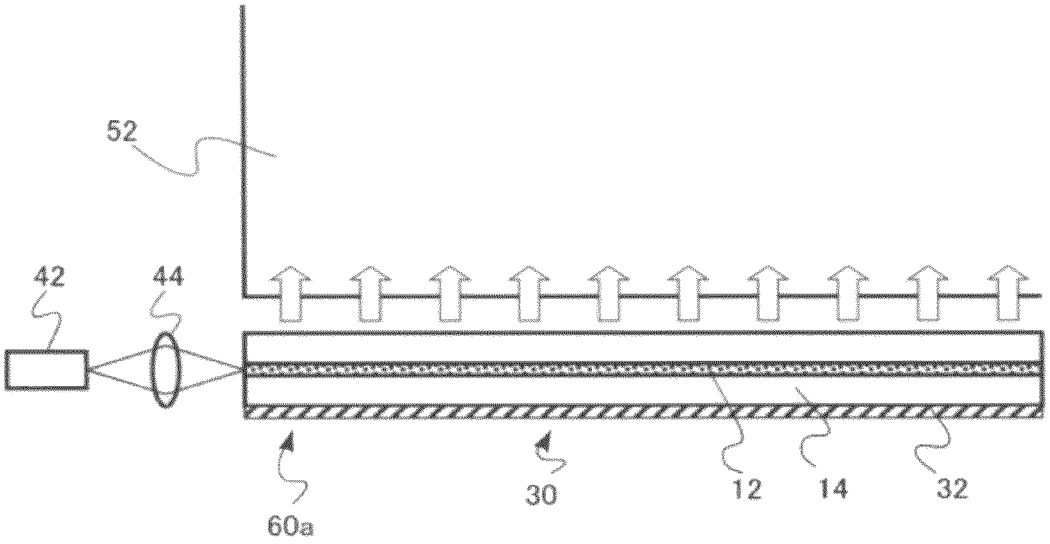

FIGS. 9A and 9B are schematic diagrams of the light emitting device according to this embodiment. FIG. 9A is a top view and FIG. 9B is an enlarged view of a portion of a dotted-line circle of FIG. 9A.

A light emitting device 50 includes a diffusion plate 52 and light emitting elements 60*a*, 60*b*, 60*c*, and 60*d* that are disposed on four edges of the diffusion plate 52. The light emitting device 50 is used as a light emitting device for a backlight of a liquid crystal display.

As shown in FIG. 9A, the light emitting element 60*a* includes a laser light source 42 that emits laser light of near-ultraviolet light, the condensing lens 44, and the light emitter 30 according to the third embodiment. The light emitter 30 and the diffusion plate 52 are bonded by a resin having a refractive index similar to a refractive index of a first resin of the light emitter 30.

According to this embodiment, light that is emitted from the light emitter 30, for example, white light is incident from the four edges of the diffusion plate 52, becomes planar light from a top surface of the diffusion plate 52, and is emitted.

A light source that emits light having the wavelength of 405 nm is used as the laser light source 42 and a ball lens is used in the condensing lens 44. In addition, aluminum fluoride ($AlF_3$) glass is used in the core portion 12 and the first region 14*a*, zirconium fluoride ($ZrF_3$) glass is used in the second regions 14*b*, the outer diameter of the light emitter 30 is set to 125 μm, and the length of the light emitter is set to 900 mm. The reflection material 32 that is obtained by coating aluminum is provided in a portion of the external surface of the light emitter 30. The light emitter 30 and the diffusion plate 52 are bonded by a fluoric resin. By this configuration, the light emitting device that has the structure shown in FIG. 9A is made to emit light with an output of 10 W of the laser light source. As a result, planar light of brightness of 10000 μm is obtained. When the light emitting device has one light emitting element, planar light of brightness of 2500 lm is obtained.

While certain embodiments have been described, these embodiments have been presented by way of example only, and are not intended to limit the scope of the inventions. Indeed, the semiconductor and the light emitting device described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

For example, the case where aluminum fluoride ($AlF_3$) and zirconium fluoride ($ZrF_3$) are used as the formation materials of the core portion and the clad portion is exemplified. These materials are preferable from a viewpoint of suppressing light from being absorbed by the materials. However, other materials, such as an aluminum oxide, a titanium oxide, a zirconium oxide, a tantalum oxide, a hafnium oxide, a niobium oxide, a lithium niobium oxide, a lithium tantalum oxide, and a vanadium yttrium oxide, may be used.

The case where the section of the second region is circular is exemplified. However, the second region may have a sectional shape, such as an elliptical shape, a triangular shape, a rectangular shape, and other polygonal shapes. The arrangement of the triangular lattice shape is exemplified as the periodic arrangement of the second regions. However, the present invention is not limited to the above arrangement, and other periodic arrangement such as arrangement of a square lattice shape may be used as long as the excitation light can be confined and the fluorescent light can be extracted without being confined.

As the light emitting materials, light emitting materials other than thulium (Tm), terbium (Tb), and europium (Eu) may be applied.

What is claimed is:

1. A light emitter having a fiber shape, comprising:
a core portion containing a light emitting material, the material absorbing excitation light and emitting light having a wavelength longer than a wavelength of the excitation light; and
a clad portion provided outside the core portion, the clad portion having a first region and second regions, the second regions being periodically formed in the first region, the second regions having a refractive index higher than a refractive index of a first region, the refractive index of the first region being equal to or higher than a refractive index of the core portion.

2. The light emitter according to claim 1,
wherein the external surface of the clad portion has an uneven structure.

3. The light emitter according to claim 2,
wherein the height difference of unevenness of the uneven structure is more than a period of the unevenness.

4. The light emitter according to claim 3,
wherein the height difference of the unevenness is 3λ or less, when the peak wavelength of light emitted from the light emitting materials is λ.

5. The light emitter according to claim 1,
wherein the core portion is aluminum fluoride ($AlF_3$) glass containing the light emitting material, the first region is aluminum fluoride ($AlF_3$) glass, and the second regions are zirconium fluoride ($ZrF_3$) glass.

6. The light emitter according to claim 1,
wherein the excitation light is near-ultraviolet light.

7. The light emitter according to claim 1,
wherein, in a section of the clad portion, the plurality of second regions is periodically disposed in a triangular lattice shape.

8. The light emitter according to claim 1,
wherein the core portion contains a first light emitting material absorbing near-ultraviolet light and emitting blue light, a second light emitting material absorbing near-ultraviolet light and emitting green light, and a third light emitting material absorbing near-ultraviolet light and emitting red light.

9. The light emitter according to claim 8,
wherein the first light emitting material is thulium (Tm), the second light emitting material is terbium (Tb), and the third light emitting material is europium (Eu).

10. The light emitter according to claim 1,
further comprising a dielectric multilayer film provided on an end face of the core portion.

11. A light emitting device, comprising:
a laser light source emitting excitation light; and
a light emitter having a fiber shape including a core portion containing a light emitting material, the material absorbing the excitation light and emitting light having a wavelength longer than a wavelength of the excitation light, and a clad portion provided outside the core portion, the clad portion having a first region and second regions, the second regions being periodically formed in the first region, the second regions having a refractive index higher than a refractive index of a first region, the refractive index of the first region being equal to or higher than a refractive index of the core portion,
wherein the excitation light is incident from an end face of the light emitter, and light emitted from the light emitting material is extracted from the external surface of the clad portion.

12. The device according to claim 11,
wherein the external surface of the clad portion has an uneven structure.

13. The device according to claim 12,
wherein the height difference of unevenness of the uneven structure is more than a period of the unevenness.

14. The device according to claim 13,
wherein the height difference of the unevenness is 3λ or less, when the peak wavelength of light emitted from the light emitting materials is λ.

15. The device according to claim 11,
wherein the core portion is aluminum fluoride ($AlF_3$) glass that containing the light emitting materials, the first region is aluminum fluoride ($AlF_3$) glass, and the second regions are zirconium fluoride ($ZrF_3$) glass.

16. The device according to claim 15,
wherein the excitation light is near-ultraviolet light.

17. The device according to claim 11,
wherein, in a section of the clad portion, the plurality of second regions is periodically disposed in a triangular lattice shape.

18. The device according to claim 11,
wherein the core portion containing a first light emitting material absorbing near-ultraviolet light and emitting blue light, a second light emitting material absorbing near-ultraviolet light and emitting green light, and a third light emitting material absorbing near-ultraviolet light and emitting red light.

19. The device according to claim 18,
wherein the first light emitting material is thulium (Tm), the second light emitting material is terbium (Tb), and the third light emitting material is europium (Eu).

20. The device according to claim 11,
further comprising a dielectric multilayer film provided on an end face of the core portion.

* * * * *